United States Patent [19]

Mizoguchi

[11] Patent Number: 4,751,520

[45] Date of Patent: Jun. 14, 1988

[54] APPARATUS AND METHOD FOR PRINTING USING A THERMAL HEAD

[75] Inventor: Yutaka Mizoguchi, Yokohama, Japan

[73] Assignee: Victor Company of Japan, Ltd., Yokohama, Japan

[21] Appl. No.: 941,469

[22] Filed: Dec. 15, 1986

[30] Foreign Application Priority Data

Dec. 13, 1985 [JP] Japan .............................. 60-279085

[51] Int. Cl.[4] .............................................. G01D 15/10

[52] U.S. Cl. ................................ 346/76 PH; 346/1.1

[58] Field of Search ........................... 346/76 PH, 1.1; 400/120

[56] References Cited

U.S. PATENT DOCUMENTS 4,484,231 11/1984 Eguchi ........................ 346/76 PH X 4,560,988 12/1985 Moriguchi et al. ........ 346/76 PH X 4,675,697 6/1987 Sasaki et al. .................. 346/76 PH

*Primary Examiner*—A. D. Pellinen

*Assistant Examiner*—Derek S. Jennings

*Attorney, Agent, or Firm*—Pollock, VandeSande & Priddy

[57] ABSTRACT

In a thermal printer with a thermal head having a plurality of heating elements arranged in line in a direction of main scanning, each of the heating elements having a plurality of heating sections arranged in a sub scanning direction with a predetermined pitch between two consecutive heating sections, it is detected first whether high density mode or low density mode is instructed and all of the heating elements of the thermal head are energized when the high density mode has been instructed, or every other heating element is energized when the low density mode has been instructed; then the thermal head being shifted relative to print paper in the sub scanning direction by a distance substantially equal to the pitch; then all of the heating elements being energized when the high density mode has been instructed, or every other heating element, which have not been energized in a previous energizing cycle, being energized when the low density mode has been instructed.

9 Claims, 5 Drawing Sheets

APPARATUS AND METHOD FOR PRINTING USING A THERMAL HEAD

BACKGROUND OF THE INVENTION

This invention is related to apparatus and method for printing using a thermal head, heat fusible transfer paper, heat sublimable transfer paper or thermosensible paper.

In a known printer having a thermal head having a plurality of head elements, the heating sections of each of the heating elements of a thermal head of a thermal printer are shifted by a distance equal to twice the pitch of the heating sections for effecting sub scanning. However, ink or coloring density is undesirably changed when transfer paper is changed with another type or when thermosensitive paper is used. As a result accurate printing cannot be performed with such a known thermal printer.

SUMMARY OF THE INVENTION

The present invention has been developed in order to remove the above-described drawbacks inherent to the conventional apparatus and method for printing using a thermal head.

It is, therefore, an object of the present invention to provide new and useful apparatus and method for printing using a thermal head so that desired ink or coloring density can be obtained irrespective of the change of transfer paper or when thermosensitive paper is used.

According to a feature of the present invention it is detected first whether high density mode or low density mode is instructed and all of the heating elements of the thermal head are energized when the high density mode has been instructed, or every other heating element is energized when the low density mode has been instructed; then the thermal head being shifted relative to print paper in sub scanning direction by a distance substantially equal to the pitch between two consecutive heating sections arranged in the sub scanning direction; then all of the heating elements being energized when the high density mode has been instructed, or every other heating element, which has not been energized in a previous energizing cycle, being energized when the low density mode has been instructed.

In accordance with the present invention there is provided a thermal printer comprising: a thermal head having a plurality of heating elements arranged in line in a direction of main scanning, each of said heating elements having a plurality of heating sections arranged in a sub scanning direction with a predetermined pitch between two consecutive heating sections, said sub scanning direction being substantially normal to said main scanning direction; a driving means for moving print paper relative to said thermal head in said sub scanning direction; movement detecting means for detecting when said print paper has moved by said predetermined pitch relative to said thermal head; a switching means for producing an output signal indicative of either high density mode or low density mode; print data processing means responsive to input print data for energizing said heating elements of said thermal head for an appropriate period of time in accordance with density information of each pixel, said print data processing means being responsive to said movement detecting means for effecting subsequent printing with said print paper being shifted by said predetermined pitch relative to said thermal head, said print data processing means being responsive to said output signal from said switching means for selecting short energizing duration for said low density mode and long energizing duration for said high density mode; and data gate means associated with said print data processing means for energizing either all or some of said heating elements of said thermal head in accordance with said output signal from said switching means.

In accordance with the present invention there is also provided a method of printing, using a thermal printer with a thermal head having a plurality of heating elements arranged in line in a main scanning direction, each of said heating elements having a plurality of heating sections arranged in a sub scanning direction with a predetermined pitch between two consecutive heating sections, said sub scanning direction being substantially normal to said main scanning direction, said method comprising the steps of: detecting whether high density mode or low density mode is instructed; energizing all of said heating elements when said high density mode has been instructed, or energizing every other said heating element when said low density mode has been instructed; shifting said thermal head relative to print paper in said sub scanning direction by a distance substantially equal to said pitch; energizing all of said heating elements when said high density mode has been instructed, or energizing every other said heating element, which have not been energized in a previous energizing cycle, when said low density mode has been instructed; and repeating said detecting step.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiments of the present invention, the above-mentioned known apparatus and method for printing will be described for a better understanding of the present invention.

Figure 1:
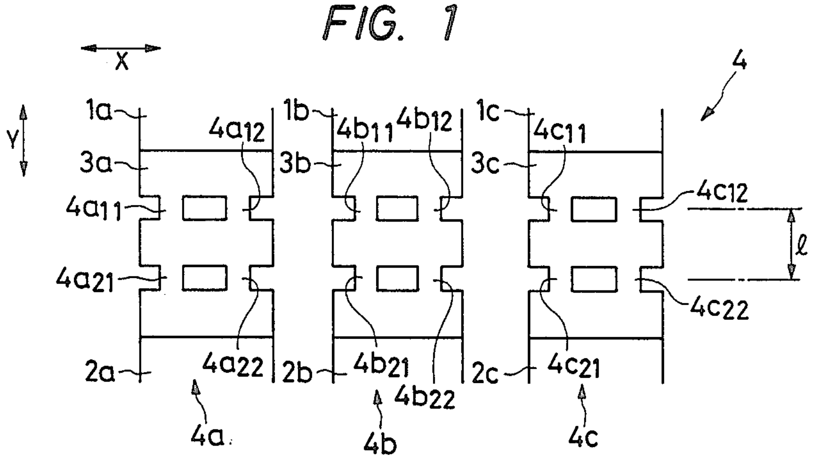
FIG. 1 shows a schematic front view of three head elements of a thermal head used in both the above-mentioned known printer and the printer according to the present invention.

FIG. 1 shows a schematic front view of three head elements of a thermal head used in both the above-mentioned known printer and the printer according to the present invention. The thermal head, which is generally designated at the reference 4, comprises a plurality of head elements 4*a*, 4*b* and 4*c*, whose number may be 1024, and these head elements 4*a*, 4*b* and 4*c* are arranged in line. In FIG. 1, only three head elements 4*a*, 4*b* and 4*c* are shown for simplicity. The references 1*a*, 1*b* and 1*c* and 2*a*, 2*b* and 2*c* designate three pairs of electrodes, and the references 3*a*, 3*b* and 3*c* are heating resistor members respectively provided between each pair of electrodes 1*a* and 2*a*, 1*b* and 2*b*, 1*c* and 2*c*. Each head element 4*a*, 4*b*, or 4*c* comprises four heating sections 4*a*11, 4*a*12, 4*a*21, 4*a*22; 4*b*11, 4*b*12, 4*b*21, 4*b*22; 4*c*11, 4*c*12, 4*c*21, 4*c*22; where these four heat sections are arranged such that two are arranged in a direction of main scanning indicated by an arrow X, and two are arranged in a direction of sub scanning indicated by an arrow Y in FIG. 1. In the known printer, the above-mentioned thermal head 4 is used as follows: after printing one line using all the head elements, the thermal head is shifted in the subscanning direction (arrow Y) by 2l where l is a heating element pitch in the subscanning direction (Y) before printing a subsequent line.

Figure 10:
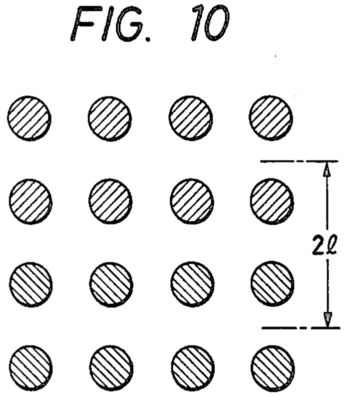
FIG. 10 shows an ideal state of printing.
Figure 11:
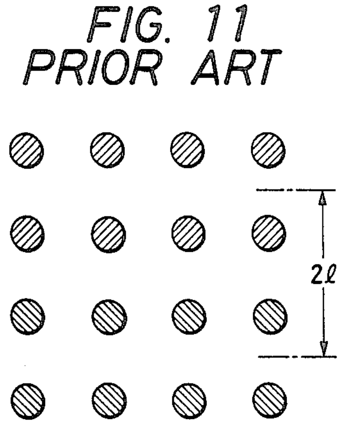
FIG. 11 PRIOR ART
FIGS. 11 and 12 show undesirable states of printing both resulted from a conventional thermal printer.
Figure 12:
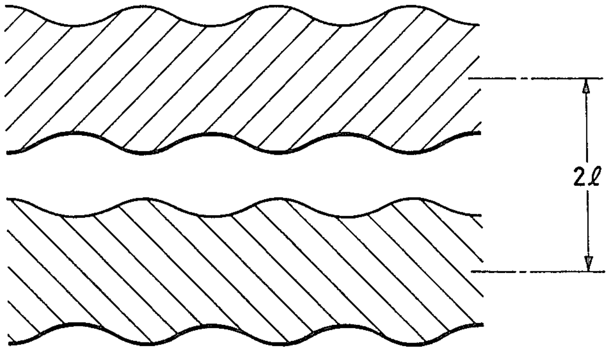
FIG. 12 PRIOR ART

However, the known printer cannot cope with the change in the sort of ink as mentioned hereinbefore. More specifically, assuming that the state of printing shown in FIG. 10 is ideal, in the case that diffusion of printed area is small as in the case of using thermosensible paper or heat sublimable transfer paper, the resulted printing is of low density as shown in FIG. 11. On the other hand, in the case that diffusion of printed area is large as in the case of using heat fusible transfer paper, high density printing is resulted such that printed areas are joined together as shown in FIG. 12. As a result, reproduction of of accurate density cannot be performed.

Figure 6:
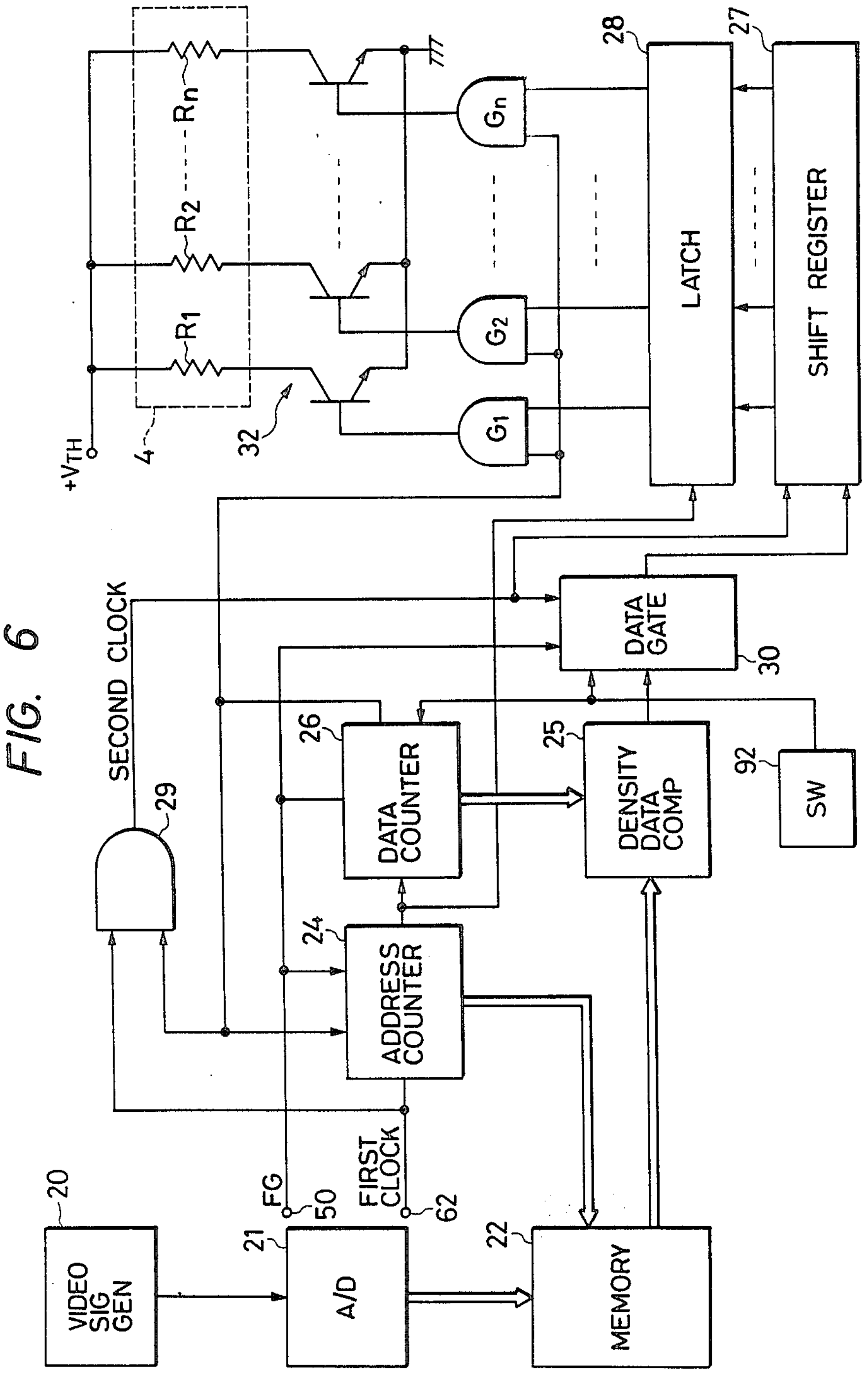
FIG. 6 is a schematic block diagram of an embodiment of the thermal printer according to the present invention.

Reference is now made to FIG. 6 showing an embodiment of the present invention. The thermal head 4 is shown to comprise a plurality of resistors R1, R2 . . . Rn which correspond to the above-mentioned resistor members 3*a*, 3*b*, 3*c* . . . The resistors R1, R2 . . . Rn are respectively associated with switching transistors 32 to be selectively energized in accordance with output signals from AND gates G1, G2 . . . Gn. A video signal generator 20 may be a TV camera, video tape recorder or the like which supplies a video signal as print information or data. The video signal, which is an analog signal, from the video signal generator 20 is converted into a digital signal by an A/D converter 21 so that a converted digital signal is fed to a memory 22. The memory 22 is arranged to store a given number of data corresponding to required number of pixels to be printed at once. Addesses of data stored in the memory 22 are designated by output from an address counter 24.

The address counter 24 is responsive to a first clock fed via an input terminal, an FG pulse signal fed via an input terminal 50, and to an output signal from a data counter 26 which is arranged to count the number of pulses from the address counter 24. More specifically, the address counter 24 designates the address of the memory 22 in accordance with the number of first clock pulses so as to read out data from a designated address. The data read out of the memory 22 is fed to a density data comparator 25 in which gradation data is compared with output data from the data counter 26. The output data from the data counter 26 is initially 0, and increases one by one in response to the output signal from the address counter 24 which output signal is generated each time the number of clock pulses reaches a predetermined number equal to the number of heat elements 4*a*, 4*b*, 4*c* . . . of the thermal head 4. For instance, this number may be 1024. Thus, when gradation data is equal to or larger than data, i.e. count, of the data counter 26, logic "1" signal is fed to a shift register 27. On the other hand, when gradation data is smaller than the data from the data counter 26, logic "0" is fed to the shift register 27.

As the address counter 24 has counted the number of the first clock pulses which is equal to the total number of the heating resistors R1, R2 . . . Rn, a data transmission pulse is fed from the address counter 24 to a latch 28 responsive to output data from the shift register 27. When a first data transfer pulse is fed to the latch 28, a heating pulse is fed from the data counter 26 to the AND gates G1, G2 . . . Gn responsive to outputs from the latch 28 respectively.

After this, each time the address counter 24 completes counting "n", the count of the data counter 26 is incremented by one. Assuming that the number of maximum gradation steps is "m", counting of "n" from the address counter 24 is performed "m" times.

An output data from the density data comparator 25 is fed via a data gate 30 to the shift register 27. The data gate 30 is responsive to the FG pulse signal and to a second clock pulse signal fed from an AND gate 29 in response to the first clock and said heating pulse from said data counter 26. The second clock is also fed to the shift register 27 to shift its input data. It will be understood that when the data gate 30 is opened, the output signal from the density comparator 25 is simply fed to the shift register 27. On the other hand, when the data gate 30 is closed, the output signal from the density comparator 25 is not fed to the shift register 27. The above-mentioned open/close control of the data gate 30 is controlled by an output signal from a switch 92 which may be semiconductor switch as will be a described hereinafter.

Figure 7:
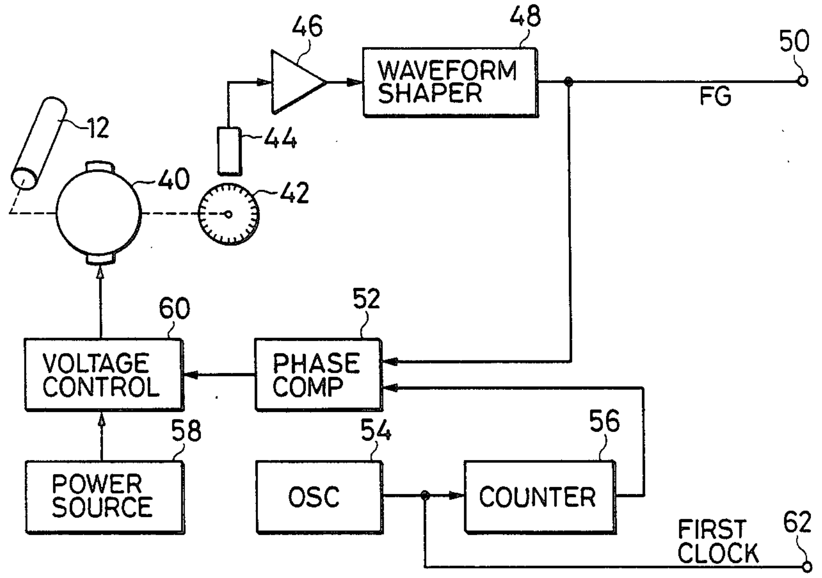
FIG. 7 is a schematic block diagram for producing FG pulse and first clock shown in FIG. 6.

FIG. 7 is a schematic block diagram showing how to produce the above-mentioned FG pulse and the first clock. A motor 40 is provided for driving a platen 12 for effecting printing on print paper (not shown) using the thermal head 4 whose structure is substantially the same as the conventional one. A disc like encoder 42 is arranged to be driven by the motor 40 so that its marks or indications provided to its circumference are detected by a photodetector 44. An output signal from the photodetector 44 is fed via a buffer amplifier 46 to a waveform shaper 48 which produces the above-mentioned pulse train FG. The number of the marks or indications provided to the encoder 42 is determined so that the FG pulse is produced each time the platen 12 is rotated to carry the print paper by a distance equal to the pitch l relative to the thermal head 4.

An oscillator 54 is provided for producing the first clock pulses whose number is counted by a counter 56 for frequency division. An output signal from the counter 56 and the FG pulse from the waveform shaper 48 are fed to a phase comparator 52 for detecting phase difference therebetween. As a result, a voltage indicative of the phase difference is produced to control voltage control circuit 60 which controls a driving voltage of the motor 40 from a power source 58.

Figure 8:
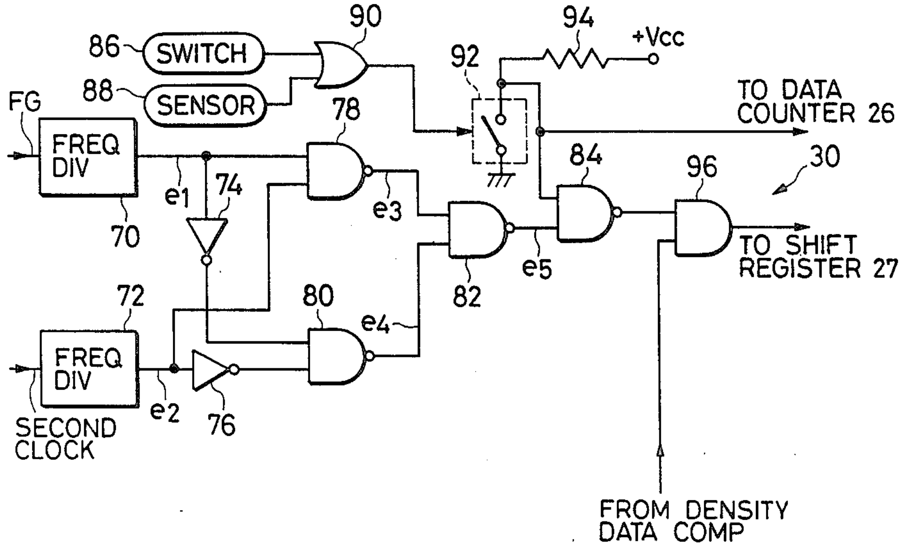
FIG. 8 is a circuit diagram of the data gate circuit used in the embodiment of FIG. 6.
Figure 9:
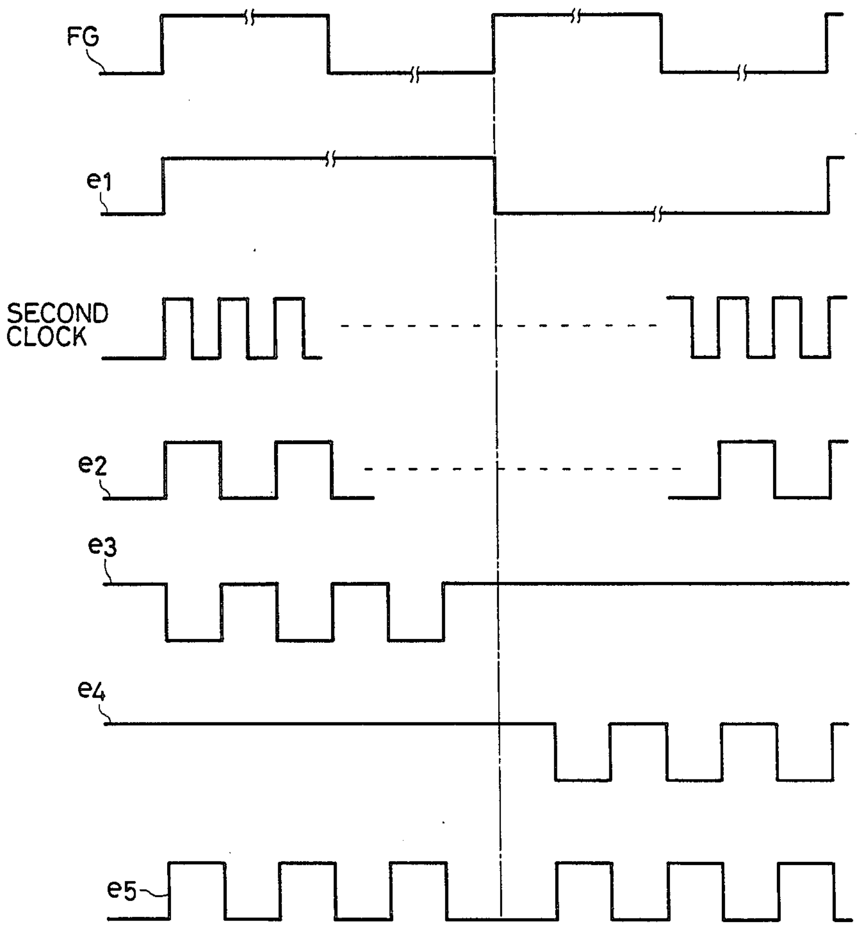
FIG. 9 is a timing chart useful for understanding the operation of the data gate circuit of FIG. 8.

FIG. 8 is a schematic block diagram of the data gate 30 shown in FIG. 6. The data gate 30 comprises a first and second frequency dividers 70 and 72 respectively responsive to the FG pulse and to the second clock for dividing the frequency by two respectively, inverters 74 and 76, NAND gates 78, 80, 82, and 84, an AND gate 96, a switch 92, and a resistor 94 connected between a voltage source +Vcc and the switch 92. The above-mentioned first and second frequency dividers 70 and 72, the inverters 74 and 76 and the NAND gates 78, 80, 82 and 84 operate to produce a pulse signal e5 whose period is twice that of the second clock. The switch 92 may be a semiconductor switch which is responsive to an OR gate 90. Various waveforms of signals used in the data gate 30 are shown in FIG. 9.

The pulse signal e5 has a frequency which is one half the frequency of the second clock having the same frequency as the first clock. Since print data from the density data comparator 25 has a frequency equal to that of the first or second clock pulse signal, the print data is thinned out by passing every other pulse from the density data comparator 25 in the "low density mode".

The reference 86 is a manual switch, and the reference 88 is a transfer paper type detector for detecting the sort or type of used transfer paper. More specifically, when thermosensible paper or heat sublimable transfer paper is used, the switch 92 is kept in on state so that the output signal from the NAND gate 84 assumes logic "1" or "H" continuously. As a result, the print data from the density data comparator 25 is fed to the shift register 27 as it is. On the other hand, when heat fusible transfer paper is used, the switch 92 is put in an off state so that the pulse signal e5 passes through the NAND gate 84 to be fed to the AND gate 96. As a result, the print data from the density data comparator 25 is thinned out such that every other print data is omitted. By applying such thinned out print data to the shift register 27, the resistors R1, R2 . . . Rn of the thermal head 4 will be energized such that every other resistor, for instance, even number resistors, is not energized. The switch 92 may be manually controlled through the manual switch 86 and/or by detecting the used transfer paper by the detector 88 which may be a photo sensor for detecting a particular indication or mark attached to a casing of transfer paper.

The output signal from the switch 92 is also fed to the data counter 26 for changing its preset value in accordance with selected density mode. More specifically, when "low density mode" is selected, the energizing duration of the resistors R1, R2 . . . Rn of the thermal head 4 is made shorter than that in the "high density mode". To this end, output data from the data counter 26 to be compared with gradation data from the memory 22 is changed to shorten the energizing duration. On the other hand, when the "high density mode" is selected, the energization duration is made long. According to experiments, the maximum energizing duration for the thermosensitive paper or heat sublimable transfer paper may be within a time period necessary for the print paper movement by the pitch l, while the maximum energizing duration for the heat fusible transfer paper may be within one half of the time period necessary for the print paper movement by the pitch l.

The thermal printer according to the present invention operates as follows:

At first it is assumed that printing will be made using heat fusible transfer paper which results in more diffusion of ink or color area than heat sublimable transfer paper or thermosensitive paper. In this case, the manual switch 86 may be manipulated to select "low density mode" so that the switch 92 is turned off. As a result only half of the resistors R1, R2 . . . Rn are energized such that every other resistor, i.e. heating elements 4*a*, 4*b*, 4*c* . . . , is disabled. More specifically, heating sections 4*a*11, 4*a*12, 4*a*21, 4*a*22, 4*c*11, 4*c*12, 4*c*21, 4*c*22 are used to generate heat while heating sections 4*b*11, 4*b*12, 4*b*21, 4*b*22 remain unenergized.

In addition, the preset data of the data counter 26 is selected to shorten the energizing duration. Printing resulted from such thinned out energization is shown in areas enclosed by dot-dash lines a and a' in FIG. 2. After printing shown in the dot-dash lines a and a', the print paper is shifted by a predetermined distance equal to the pitch l in the sub scanning direction (Y) (see FIG. 1) relative to the thermal head 4 by rotating the platen 12. After the shifting by l, the resistor R2, i.e. the heating element 4*b*, is energized so that heating sections 4*b*11, 4*b*12, 4*b*21 and 4*b*22 generate heat to effect printing at an area enclosed by broken lines b in FIG. 2. In other words, those heating elements, which have not been energized in a previous energizing cycle, are now energized. In this way, a set of every other heating elements 4*a*, 4*c* . . . is first energized and another set of every other heating elements 4*b* . . . is then energized after the shifting by l. It is to be noted that print data stored in the memory 22 of FIG. 6 is read out twice so that the same print line data is used for effecting printing shown at a, a' and b. More specifically, assuming that odd number data of a print line data is first fed to the heating elements 4*a*, 4*c* . . . , then even number data of the same print line data is fed to the heating elements 4*b* . . . After both sets, i.e. odd number and even number, of the heat elements are energized in the above-mentioned manner, then print line data of a subsequent line is fed to the heating elements 4*a*, 4*c* . . . To this end, the subsequent print line data is fed from the A/D converter 21 to the memory 22 to renew its stored data. This is repeated so that these two sets of heating elements are alternately energized with the print paper being shifted by the pitch l relative to the thermal head 4.

Figure 2:
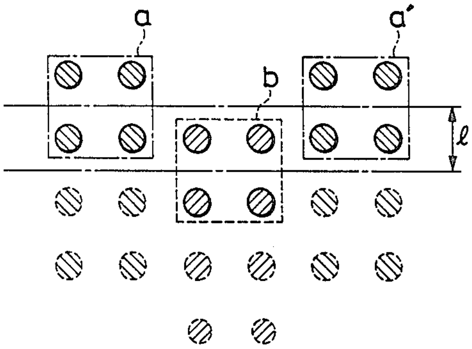
FIGS. 2 through 5 are diagrams showing the way of printing according to the present invention.
Figure 3:
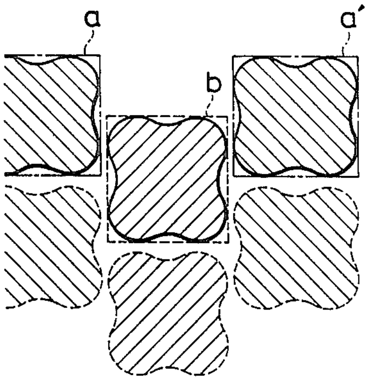

FIG. 2 shows the above-mentioned printing state where current flowing through the resistors R1, R2 . . . Rn of the thermal head 4 is relatively small, and FIG. 3 shows the same where the current is larger than the case of FIG. 2. Since printing is effected as described in the above in "low density mode, even if the density of each pixel is high, coloring area by one heating element does not affect adjacent coloring area. As a result, the aforementioned undesirable junction between consecutive coloring areas shown in FIG. 12 does not occur. Furthermore, in the case that the density is low as shown in FIG. 2, the number of printing dots is larger than that in FIG. 3 and thus smooth printing can be performed.

Figure 4:
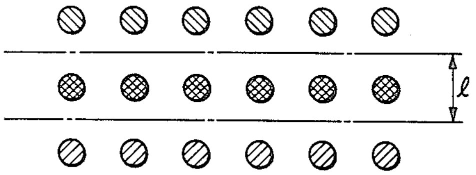
Figure 5:
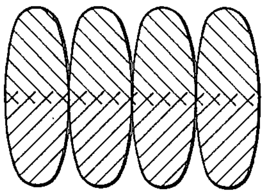

Let us assume that printing will be made using heat sublimable transfer paper or thermosensitive paper which results in less diffusion of ink or coloring area than heat fusible transfer paper. In this case, the manual switch 86 may be manipulated to select "high density mode" so that the switch 92 is turned on. As a result all the resistors R1, R2 . . . Rn are energized. In other words, each line is printed by using all the heating elements 4*a*, 4*b*, 4*c* . . . without thinning out. After printing one line, then the print paper is shifted by the pitch l relative to the thermal head 4 in the same manner as in the "low density mode". As such way of printing is continued, printing shown in FIG. 4 or FIG. 5 is resulted. FIG. 4 shows a case where current fed to the resistors R1, R2 . . . Rn is small, and FIG. 5 shows a case where the current is large.

The preset data of the data counter 26 is selected to lengthen the energizing duration. As printing is effected in the "high density mode" as described in the above, the density will be sufficiently high even if diffusion of coloring area is small since printing after the second line is effected by overlapping printing or double printing.

In the above-described embodiment, although the energizing duration is changed by changing the preset data of the data counter 26, the same result can be obtained by controlling the gates G1, G2 . . . Gn. Furthermore, in place of controlling the energizing duration or in addition to the same, the power source voltage +Vth fed to the resistors R1, R2 . . . Rn may be changed in accordance with a selected density mode.

The above-described embodiments are just examples of the present invention, and therefore, it will be apparent for those skilled in the art that many modifications and variations may be made without departing from the scope of the present invention.

What is claimed is:

1. A thermal printer comprising:

(a) a thermal head having a plurality of heating elements arranged in line in a direction of main scanning, each of said heating elements having a plurality of heating sections arranged in a sub scanning direction with a predetermined pitch between two consecutive heating sections, said sub scanning direction being substantially normal to said main scanning direction;

(b) a driving means for moving print paper relative to said thermal head in said sub scanning direction;

(c) movement detecting means for detecting when said print paper has moved by said predetermined pitch relative to said thermal head;

(d) a switching means for producing an output signal indicative of either high density mode or low density mode;

(e) print data processing means responsive to input print data for energizing said heating elements of said thermal head for an appropriate period of time in accordance with density information of each pixel, said print data processing means being responsive to said movement detecting means for effecting subsequent printing with said print paper being shifted by said predetermined pitch relative to said thermal head, said print data processing means being responsive to said output signal from said switching means for selecting short energizing duration for said low density mode and long energizing duration for said high density mode; and (f) data gate means associated with said print data processing means for energizing either all or some of said heating elements of said thermal head in accordance with said output signal from said switching means.

2. A thermal printer as claimed in claim 1, wherein said data gate means comprises:

(a) pulse generating means for producing a pulse signal whose frequency is one half a frequency at which said data is fed to said gate means; and (b) a gate for blocking every other data in response to said pulse signal from said pulse generating means.

3. A thermal printer as claimed in claim 1, wherein said movement detecting means comprises:

(a) a movable member arranged to rotate with a motor used for moving said print paper relative to said thermal head, said movable member having a plurality of indications along its circumference; and (b) a sensor for detecting said indications to thereby produce an output signal.

4. A thermal printer as claimed in claim 1, further comprising memory means for storing said input print data, and memory control means for reading out stored print data twice so that first read out data is fed to a first set of said heating elements and subsequently read out data is fed to a second set of said heating elments.

5. A thermal printer as claimed in claim 1, further comprising a manual switch for producing said instruction signal indicative of either high density mode or low density mode.

6. A thermal printer as claimed in claim 1, further comprising a sensor for detecting an indication provided to a casing of transfer paper for producing said instruction signal indicative of either high density mode or low density mode.

7. A method of printing, using a thermal printer with a thermal head having a plurality of heating elements arranged in line in a main scanning direction, each of said heating elements having a plurality of heating sections arranged in a sub scanning direction with a predetermined pitch between two consecutive heating sections, said sub scanning direction being substantially normal to said main scanning direction, said method comprising the steps of:

(a) detecting whether high density mode or low density mode is instructed;

(b) energizing all of said heating elements when said high density mode has been instructed, or energizing every other said heating elements when said low density mode has been instructed;

(c) shifting said thermal head relative to print paper in said sub scanning direction by a distance substantially equal to said pitch;

(d) energizing all of said heating elements when said high density mode has been instructed, or energizing every other said heating elements, which have not been energized in a previous energizing cycle, when said low density mode has been instructed; and (e) repeating said steps other than said step of detecting.

8. A method of printing as claimed in claim 7, further comprising a step of detecting whether said high density mode or low density mode is required by detecting an indication provided to a casing of transfer paper.

9. A method of printing as claimed in claim 7, further comprising a step of selecting short energizing duration for said low density mode and long energizing duration for said high density mode.

* * * * *